(12) United States Patent
Chiang et al.

(10) Patent No.: US 12,001,248 B2
(45) Date of Patent: Jun. 4, 2024

(54) HINGE STRUCTURE

(71) Applicant: ASUSTEK COMPUTER INC., Pei Tou (TW)

(72) Inventors: Tsung-Ju Chiang, Pei Tou (TW); Marco Da Ros, Pei Tou (TW); Yung-Hsiang Chen, Pei Tou (TW); Li Wei Hung, Pei Tou (TW)

(73) Assignee: ASUSTEK COMPUTER INC., Taipei (TW)

( * ) Notice: Subject to any disclaimer, the term of this patent is extended or adjusted under 35 U.S.C. 154(b) by 306 days.

(21) Appl. No.: 17/333,290

(22) Filed: May 28, 2021

(65) Prior Publication Data

US 2022/0129044 A1 Apr. 28, 2022

(30) Foreign Application Priority Data

Oct. 23, 2020 (TW) ................................. 109136784

(51) Int. Cl.
*G06F 1/16* (2006.01)
(52) U.S. Cl.
CPC .................................. *G06F 1/1681* (2013.01)
(58) Field of Classification Search
CPC .................................................... G06F 1/1681
See application file for complete search history.

(56) References Cited

U.S. PATENT DOCUMENTS

| | | | |
|---|---|---|---|
| 7,117,562 B2 | 10/2006 | Zuo et al. | |
| 7,353,568 B2 * | 4/2008 | Duan ................. | H04M 1/0218 16/326 |
| 7,536,750 B2 * | 5/2009 | Lin ........................ | G06F 1/1686 16/334 |
| 7,847,194 B2 * | 12/2010 | Kuwajima ............ | G06F 1/1616 361/679.01 |
| 7,913,359 B2 * | 3/2011 | Duan .................... | E05F 1/1207 16/386 |
| 8,056,186 B2 * | 11/2011 | Zhang ................. | H04M 1/0216 16/326 |
| 8,056,187 B2 * | 11/2011 | Wang .................... | G06F 1/1681 16/326 |
| 8,079,115 B2 * | 12/2011 | Zhang ................. | H04M 1/0216 16/326 |
| 8,186,016 B2 * | 5/2012 | Choi .................... | H04M 1/0216 16/303 |
| 8,209,816 B2 * | 7/2012 | Heger ...................... | B60R 1/06 16/334 |

(Continued)

FOREIGN PATENT DOCUMENTS

| | | |
|---|---|---|
| CN | 201487017 U | 5/2010 |
| CN | 201858252 U | 6/2011 |

(Continued)

*Primary Examiner* — Jason W San
(74) *Attorney, Agent, or Firm* — MUNCY, GEISSLER, OLDS & LOWE, PC

(57) ABSTRACT

A hinge structure applied to an electronic device having a first component and a second component is provided. The hinge structure includes a torque hinge and a one-way pivoting mechanism. The torque hinge includes a first base and a first rotation element. The first base connects to the first component. The first rotation element rotatably connects to the first base. The second component pivotally connects to the first rotation element through the one-way pivoting mechanism.

6 Claims, 15 Drawing Sheets

(56) References Cited

U.S. PATENT DOCUMENTS

| | | | | |
|---|---|---|---|---|
| 8,336,167 B2* | 12/2012 | Kim | ............... | H04M 1/0216 |
| | | | | 16/326 |
| 8,424,160 B2* | 4/2013 | Chen | ............... | E05D 11/084 |
| | | | | 16/295 |
| 8,544,151 B2* | 10/2013 | Courbon | ............ | E05D 11/1078 |
| | | | | 16/334 |
| 8,683,655 B2* | 4/2014 | Hong | .................. | E05F 3/20 |
| | | | | 16/306 |
| 8,720,845 B2* | 5/2014 | Courbon | ............. | B60R 1/0612 |
| | | | | 359/872 |
| 8,984,718 B2* | 3/2015 | Ejdehag | ............. | F16C 11/10 |
| | | | | 16/436 |
| 9,290,880 B2* | 3/2016 | Park | .................. | D06F 39/14 |
| 9,394,645 B2* | 7/2016 | Park | .................. | D06F 39/14 |
| 11,077,797 B2* | 8/2021 | Henion | ............... | B60R 1/074 |
| 11,262,595 B2* | 3/2022 | Chen | .................. | G02C 5/22 |
| 11,491,917 B2* | 11/2022 | Yamashita | .......... | F16M 13/022 |
| 11,707,018 B2* | 7/2023 | Driscoll | ............. | A01D 34/001 |
| | | | | 56/229 |
| 2011/0083300 A1* | 4/2011 | Heger | ................. | B60R 1/06 |
| | | | | 16/321 |

FOREIGN PATENT DOCUMENTS

| | | |
|---|---|---|
| CN | 204553526 U | 8/2015 |
| CN | 10332254 A | 10/2019 |
| TW | M262965 U | 4/2005 |
| TW | M376117 U | 3/2010 |

* cited by examiner

HINGE STRUCTURE

CROSS-REFERENCE TO RELATED APPLICATION

This application claims the priority benefit of Taiwan Application Serial No. 109136784, filed on Oct. 23, 2020. The entirety of the above-mentioned patent application is hereby incorporated by reference herein and made a part of specification.

BACKGROUND OF THE INVENTION

Field of the Invention

The present disclosure relates to a hinge structure, and in particular, to a hinge structure for electronic devices.

Description of the Related Art

The hinge structure of a notebook computer is usually equipped with a torque hinge to enable a screen to retain in a required angle. However, as the characteristic of a torque hinge, enough force has to be applied while opening or closing a screen of a conventional notebook computer. Particularly, when open the screen, a user usually needs to hold the computer host and the screen at the same time and applies forces appropriately to open the screen.

BRIEF SUMMARY OF THE INVENTION

According to an embodiment of the present disclosure, a hinge structure, applied to an electronic device is disclosed. The electronic device includes a first component and a second component. The hinge structure includes a torque hinge and a one-way pivoting mechanism. The torque hinge includes a first base and a first rotation element. The first base connects to the first component, and the first rotation element rotatably connects to the first base. The second component pivotally connects to the first rotation element through the one-way pivoting mechanism.

According to another embodiment of the present disclosure, the present disclosure provides another hinge structure, applied to an electronic device. The electronic device includes a first component and a second component. The hinge structure includes a first torque hinge, a second torque hinge, a first one-way pivoting mechanism and a second one-way pivoting mechanism.

The first torque hinge includes a first base and a first rotation element. The first base is connected to the first component, and the first rotation element rotatably connects to the first base. The second torque hinge includes a second base and a second rotation element. The second base connects to the first component, and the second rotation element rotatably connects to the second base.

The second component pivotally connects to the first rotation element through the first one-way pivoting mechanism. The first one-way pivoting mechanism pivotally connects to the second rotation element through the second one-way pivoting mechanism. The first one-way pivoting mechanism and the second one-way pivoting mechanism are rotatable in opposite directions.

By the hinge structure provided in the disclosure, when a user opens the second component (for example, a screen of a notebook computer), the second component drives the one-way pivoting mechanism to rotate, and does not drive the torque hinge to move. In contrast, when the user closes the second component, the second component drives the torque hinge to rotate. In this way, the second component is maintained at a position with desired angle by a sufficient support force provided by the torque hinge, and the second component is easily opened for a user by using a single hand.

DETAILED DESCRIPTION OF THE EMBODIMENTS

A detailed description of embodiments of the present disclosure will be given below with reference to schematic diagrams. The advantages and features of present disclosure will become clearer from the following description and claims. It should be noted that the drawings are in a very simplified form and not drawn to scale, and are merely intended to conveniently and clearly explain the objectives of the embodiments of the present disclosure.

Figure 1A:
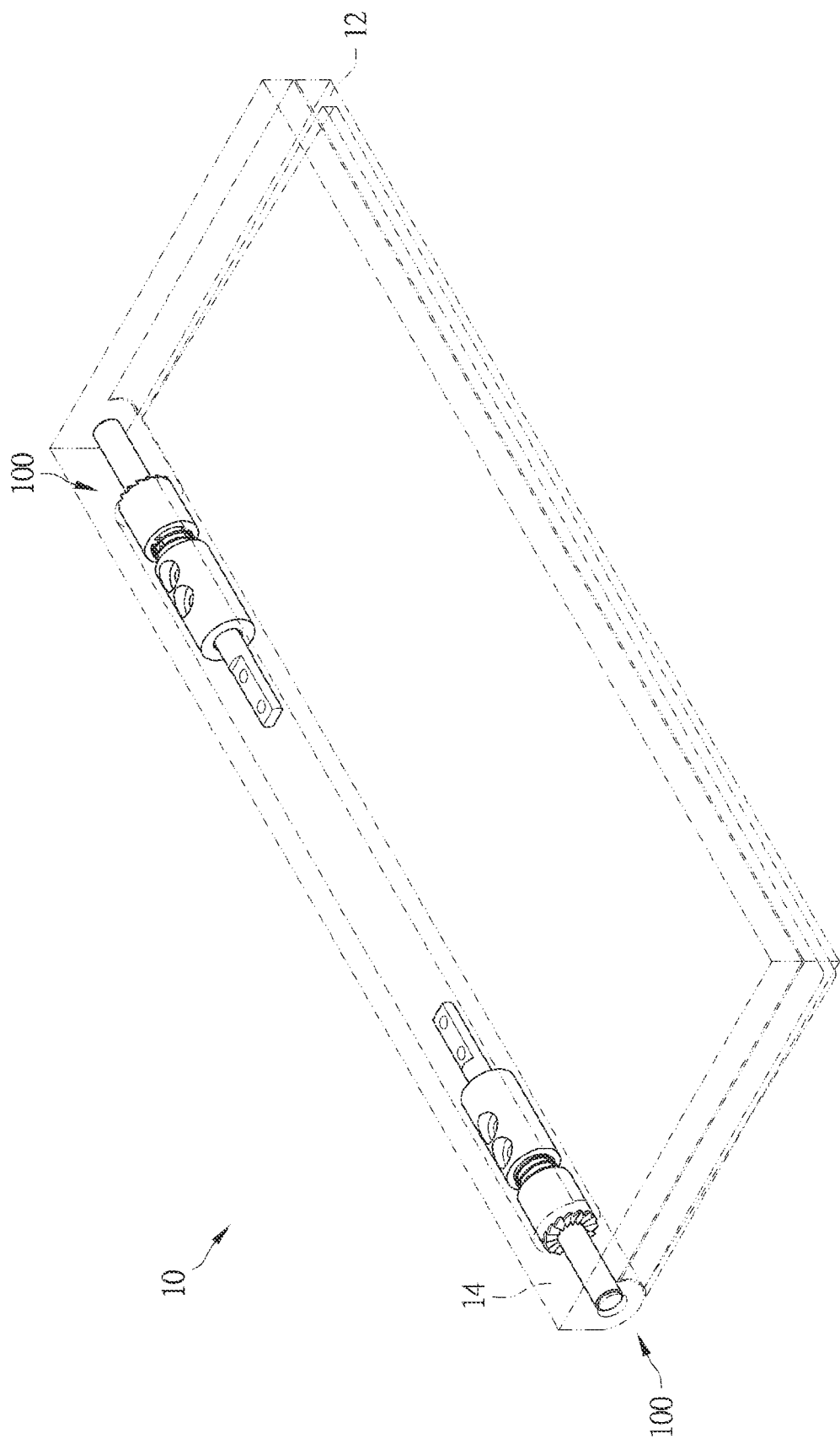
FIG. 1A and FIG. 1B are three-dimensional schematic diagrams of an embodiment where an electronic device of the present disclosure in an open state and a closed state.
Figure 1B:
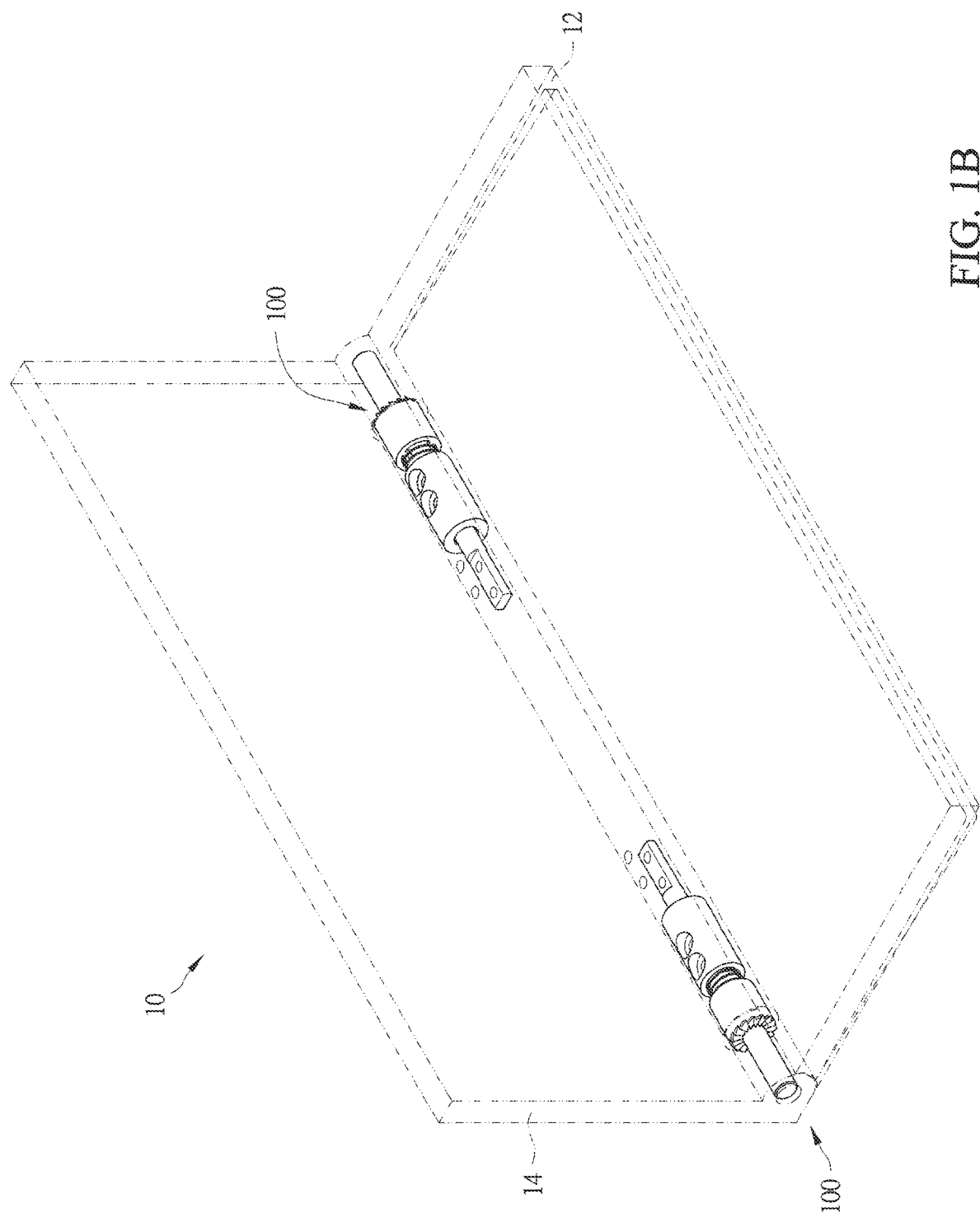

Referring to FIG. 1A and FIG. 1B, FIG. 1A and FIG. 1B are three-dimensional schematic diagrams of an embodiment where an electronic device of the present disclosure in an open state and a closed state. As shown in the figures, the electronic device 10 includes a first component 12, a second component 14, and two hinge structures 100. The two hinge structures 100 are disposed at a junction between the first component 12 and the second component 14, so that the second component 14 moves relative to the first component 12.

In an embodiment, the electronic device 10 is a notebook computer, the first component 12 is a host part of the notebook computer, and the second component 14 is a screen part of the notebook computer.

Figure 2:
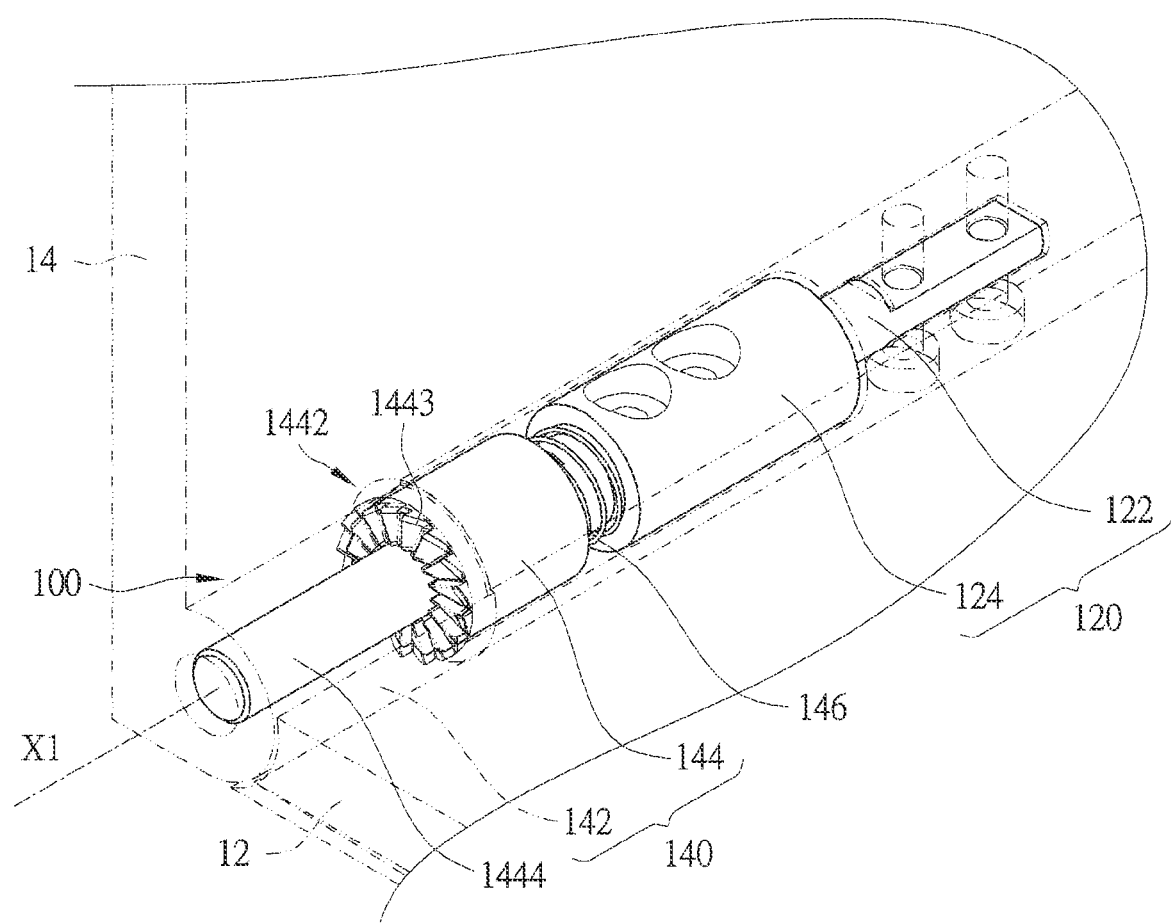
FIG. 2 is an enlarged view of a hinge structure in FIG. 1B.

Referring to FIG. 2, FIG. 2 is an enlarged view of a hinge structure 100 in FIG. 1B. As shown in the figure, the hinge structure 100 includes a torque hinge 120 and a one-way pivoting mechanism 140. The torque hinge 120 includes a first base 122 and a first rotation element 124. The first base 122 connects to the first component 12, and the first rotation element 124 rotatably connects to the first base 122. In an embodiment, the torque hinge 120 uses a frictional resistance between the first base 122 and the first rotation element 124 as a source of torsion to support the second component 14.

The one-way pivoting mechanism 140 includes a first shaft 142 and a second shaft 144. The first shaft 142 connects to the second component 14, the second shaft 144 rotatably connects to the first shaft 142 in a single direction, and the second shaft 144 movably connects to the first rotation element 124.

In an embodiment, the second shaft 144 movably connects to the first rotation element 124 along an axial direction X1 of the one-way pivoting mechanism, and an elastic element 146 is provided between the second shaft 144 and the first rotation element 124 to push the second shaft 144 toward the first shaft 142.

The unidirectional rotation mechanism between the first shaft 142 and the second shaft 144 will be described in further detail in the following paragraphs corresponding to FIG. 3 and FIG. 4A. The elastic element 146 will be described in further detail in the following paragraphs corresponding to FIG. 6A and FIG. 6B.

Figure 3:
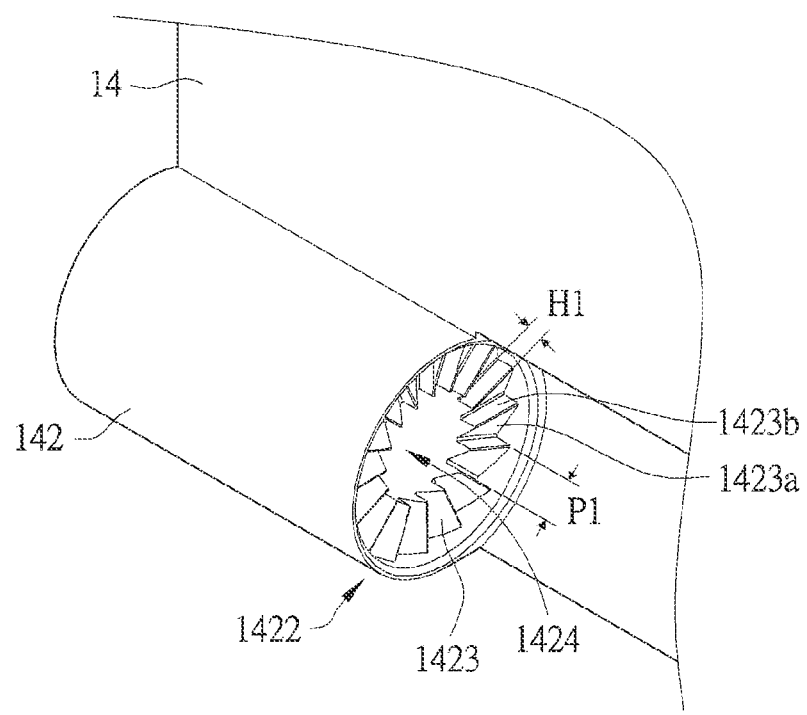
FIG. 3 is a three-dimensional schematic diagram of an embodiment of a first shaft in FIG. 2.
Figure 4A:
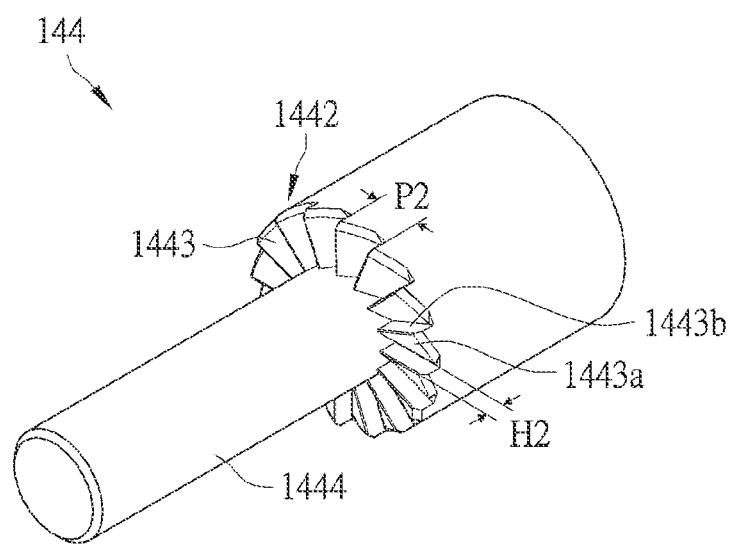
FIG. 4A is a three-dimensional schematic diagram of a side of a second rotation element facing the first shaft.

Referring to FIG. 3 and FIG. 4A, FIG. 3 is a three-dimensional schematic diagram of an embodiment of a first shaft in FIG. 2, and FIG. 4A is a three-dimensional schematic diagram of a side of a second rotation element facing the first shaft.

As shown in the figures, the first shaft 142 includes a first surface 1422 and a circular opening 1424, the first surface 1422 is located on a side of the first shaft 142 facing the second shaft 144, and the circular opening 1424 is formed at a center of the first surface 1422.

The second shaft 144 includes a second surface 1442 and a cylindrical protrusion 1444, the second surface 1442 is located on a side of the second shaft 144 facing the first shaft 142, and the cylindrical protrusion 1444 is formed at a center of the second surface 1442.

The cylindrical protrusion 1444 of the second shaft 144 is configured to dispose in the circular opening 1424 of the first shaft 142, so that the second shaft 144 pivotally connects to the first shaft 142.

The first surface 1422 includes a plurality of first oblique tooth structures 1423. The first oblique tooth structures 1423 are annularly arranged in a preset direction around the circular opening 1424. The second surface 1442 includes a plurality of second oblique tooth structures 1443.

The second oblique tooth structures 1443 are annularly arranged in a preset direction around the cylindrical protrusion 1444. The second oblique tooth structures 1443 are corresponding to the plurality of first oblique tooth structures 1423 on the first surface 1422.

In an embodiment, referring to FIG. 3 and FIG. 4A, the first oblique tooth structures 1423 and the second oblique tooth structures 1443 face each other, and are annularly arranged in opposite directions, and a tooth pitch P1 and a tooth height H1 of the first oblique tooth structures 1423 are identical to a tooth pitch P2 and a tooth height H2 of the second oblique tooth structures 1443.

Each of the first oblique tooth structures 1423 includes an inclined surface 1423a and a straight surface 1423b. Each of the second oblique tooth structures 1443 includes an inclined surface 1443a and a straight surface 1443b.

An inclination angle of the inclined surface 1423a of the first oblique tooth structure 1423 is identical to an inclination angle of the inclined surface 1443a of the second oblique tooth structure 1443. The straight surface 1423b of the first oblique tooth structure 1423 is perpendicular to the first surface 1422, and the straight surface 1443b of the second oblique tooth structure 1443 is perpendicular to the second surface 1442.

When the second component 14 rotates toward the first component 12, i.e., when the user closes the second component 14, the straight surfaces 1423b of the first oblique tooth structures 1423 abut against the straight surfaces 1443b of the second oblique tooth structures 1443. Then the first oblique tooth structures 1423 engages with the second oblique tooth structures 1443.

In this case, the second shaft 144 rotates along with the first shaft 142, the second shaft 144 drives the first rotation element 124 of the torque hinge 120 to rotate at the same time, and the torque hinge 120 provides a rotational resistance.

When the second component 14 rotates in a direction away from the first component 12, i.e., the second component 14 opens upward relative to the first component 12, the inclined surfaces 1423a of the first oblique tooth structures 1423 abut against the inclined surfaces 1443a of the second oblique tooth structures 1443. An acting force is generated to push the second shaft 144 to move away from the first shaft 142, so as to detach the first oblique tooth structures 1423 from the second oblique tooth structures 1443. Through the aforementioned actuation mechanism, the first shaft 142 rotates relative to the second shaft 144 only through a small external force.

Figure 4B:
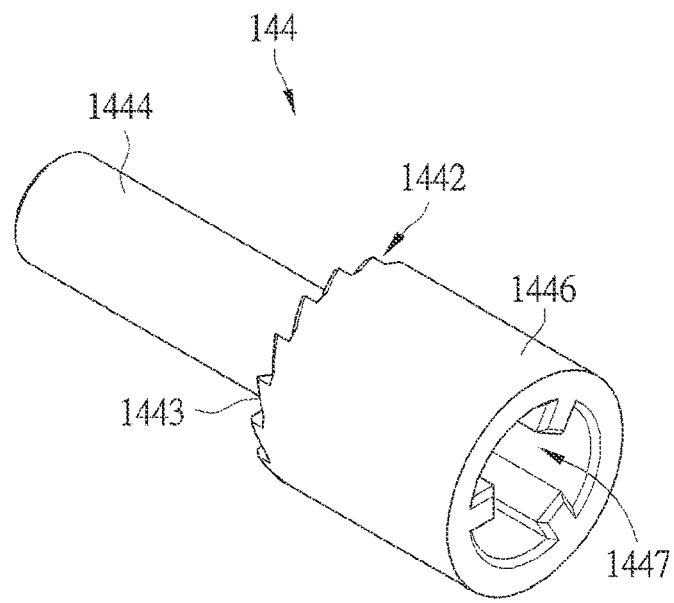
FIG. 4B is a three-dimensional schematic diagram of a side of the second rotation element facing a first rotation element.
Figure 5:
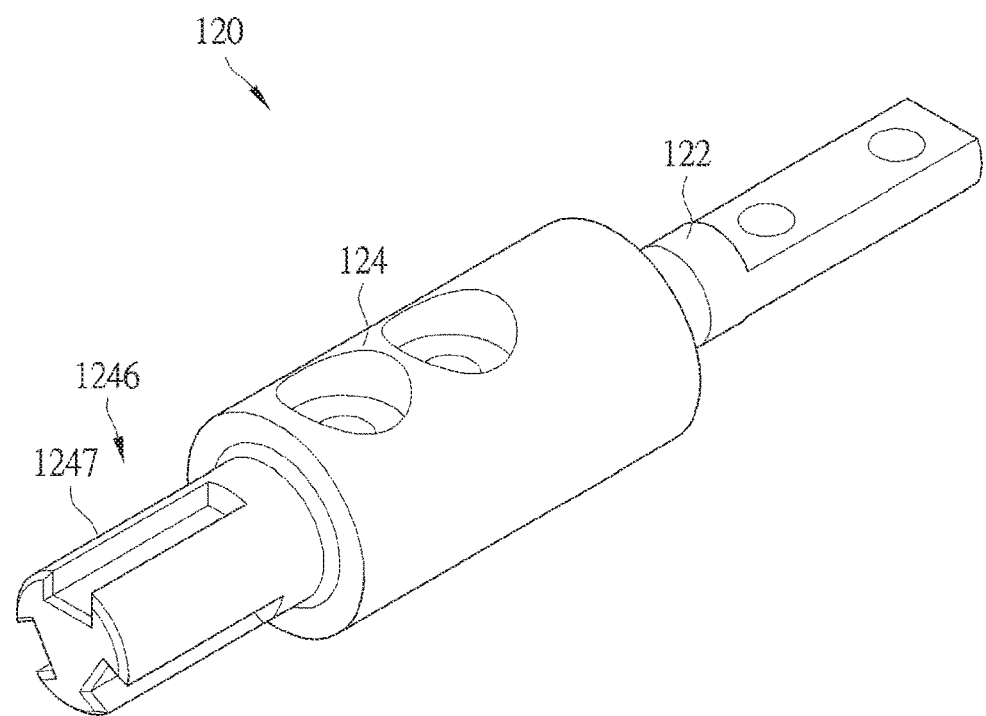
FIG. 5 is a three-dimensional schematic diagram of an embodiment of the first rotation element according to the present disclosure.

Referring to FIG. 4B and FIG. 5, FIG. 4B is a three-dimensional schematic diagram of a side of the second rotation element facing a first rotation element, and FIG. 5 is a three-dimensional schematic diagram of an embodiment of the first rotation element according to the present disclosure.

As shown in the figures, the second shaft 144 includes a sleeve portion 1446, and the sleeve portion 1446 is located on a side of the second shaft 144 facing the first rotation element 124, i.e., a side of the second shaft 144 away from the first shaft 142. The sleeve portion 1446 includes therein at least one slide groove 1447 (where three slide grooves are shown in the figures).

The first rotation element 124 includes an end portion 1246. The end portion 1246 is located on a side of the first rotation element 124 facing the second shaft 144, and is fitted inside the sleeve portion 1446.

Referring to FIG. 4B and FIG. 5, the end portion 1246 further includes at least one protruding element 1247 (where three slide grooves are shown in the figures). The protruding elements 1247 are slidably disposed in the slide grooves 1447, to limit the rotation of the second shaft 144 relative to the first rotation element 124. Then the second shaft 144 moves along the axial direction X1 relative to the first rotation element 124.

Figure 6A:
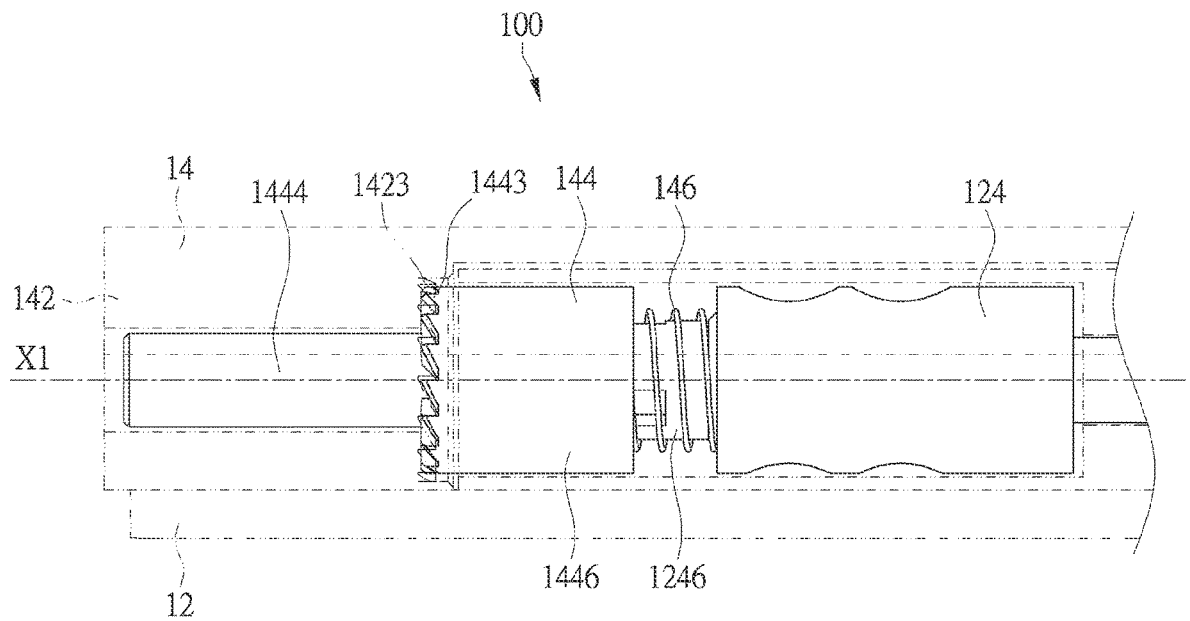
FIG. 6A and FIG. 6B show an overall operation process of the hinge structure of the present disclosure when the second component opens upward relative to the first component.
Figure 6B:
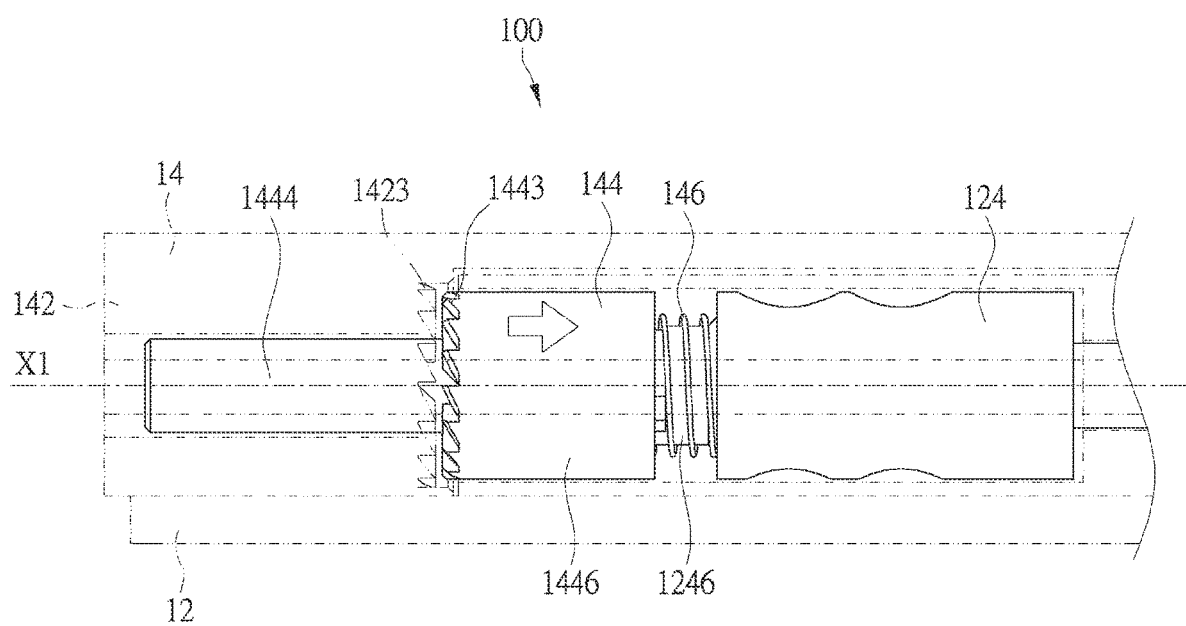

FIG. 6A and FIG. 6B show an overall operation process of the hinge structure 100 of the disclosure when the second component 14 opens upward relative to the first component 12.

As shown in the figures, when the second component 14 opens upward relative to the first component 12, the first shaft 142 is driven by the second component 14 to rotate. In this case, referring to FIG. 3 and FIG. 4A, the first oblique tooth structures 1423 on the first surface 1422 push the second oblique tooth structures 1443 on the second surface 1442 to move away from the first shaft 142, so as to detach the first oblique tooth structures 1423 from the second oblique tooth structures 1443 and therefore detach the second shaft 144 from the first shaft 142.

When the first oblique tooth structures 1423 push the second oblique tooth structures 1443 to move away from the first shaft 142, the second shaft 144 moves toward the first rotation element 124 so that the elastic element 146 is compressed to deform.

The compression deformation of the elastic element 146 produces an elastic restoring force to push the second shaft 144 toward the first shaft 142, so that the first oblique tooth structures 1423 and the second oblique tooth structures 1443 restore the original engaged state. By repeating the aforementioned operating mechanism, the second component 14 moves relative to the first component 12 only through a small external force.

In contrast, when the second component 14 rotates relative to the first component 12, the first oblique tooth structures 1423 engages with the second oblique tooth structures 1443. In this case, the second shaft 144 rotates along with the first shaft 142, the second shaft 144 drives the first rotation element 124 of the torque hinge 120 to rotate at the same time, and the torque hinge 120 provides a rotational resistance to support the second component 14. By the aforementioned operating mechanism, the opening operation requires a small force and the closing operation requires a larger force.

Figure 7:
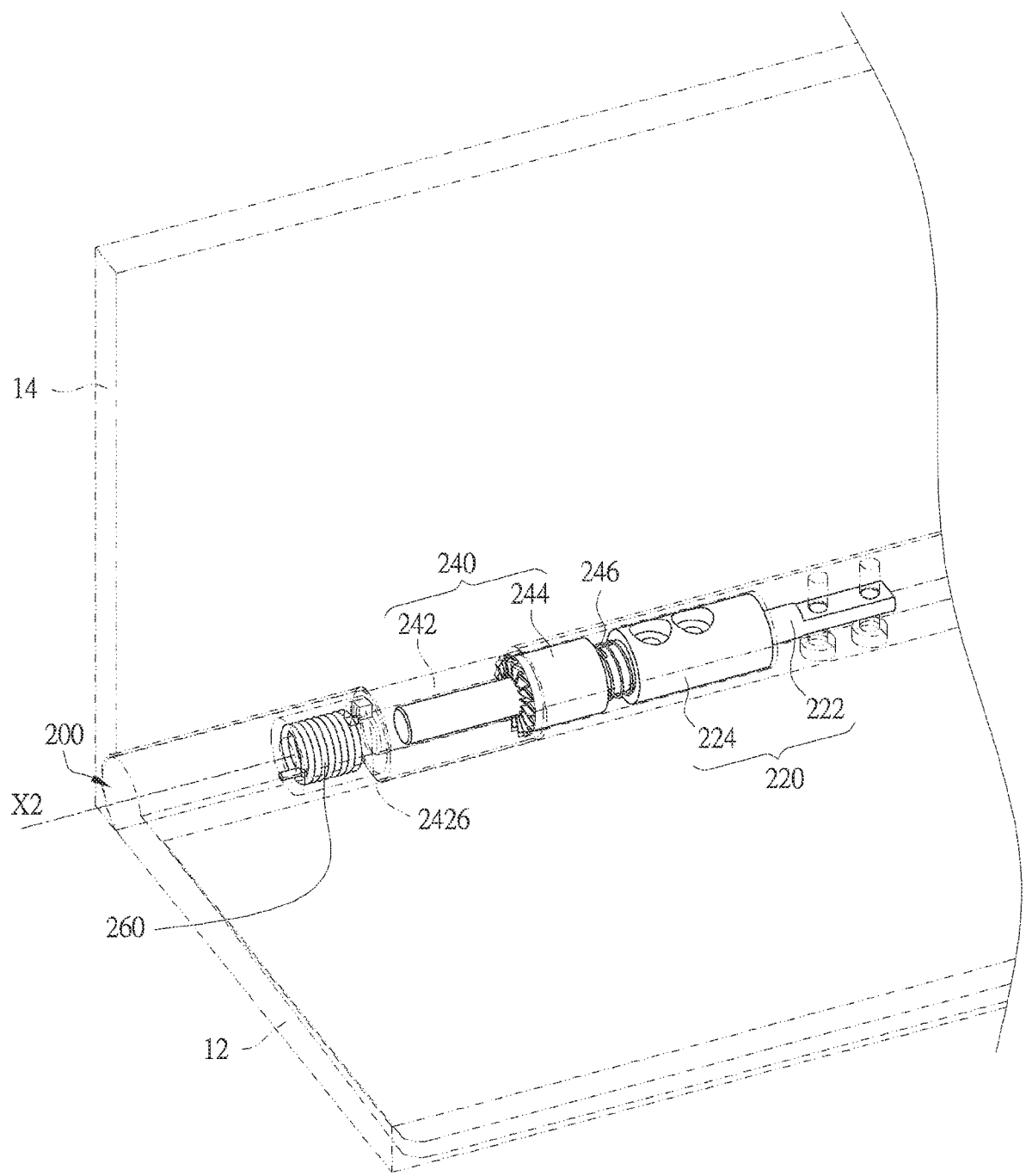
FIG. 7 is a three-dimensional schematic diagram of another embodiment of a hinge structure of the present disclosure.

FIG. 7 is a three-dimensional schematic diagram of another embodiment of a hinge structure of the present disclosure. As shown in the figure, the hinge structure 200 includes a torque hinge 220, a one-way pivoting mechanism 240, and a torsion spring 260.

The torque hinge 220 includes a first base 222 and a first rotation element 224. The first base 222 connects to the first component 12, and the first rotation element 224 rotatably connects to the first base 222.

The one-way pivoting mechanism 240 includes a first shaft 242 and a second shaft 244. The first shaft 242 connects to the second component 14, and the second shaft 244 rotatably connects to the first shaft 242 in a single direction. The second shaft 244 movably connects to the first rotation element 224 along an axial direction X2 of the one-way pivoting mechanism 240.

That is to say, the first rotation element 224 rotates along with the second shaft 244, but the second shaft 244 is movable along an axial direction X2 of the one-way pivoting mechanism 240.

An elastic element 246 is provided between the second shaft 244 and the first rotation element 224. The linking manner between the torque hinge 220 and the one-way pivoting mechanism 240 in the present embodiment is similar to that between the torque hinge 120 and the one-way pivoting mechanism 140 in FIG. 2, and the details will not be repeated herein.

The torsion spring 260 is disposed on a side of the first shaft 242 away from the second shaft 244. One end of the torsion spring 260 fixes to the first component 12, and the other end is driven by the first shaft 242.

Figure 8A:
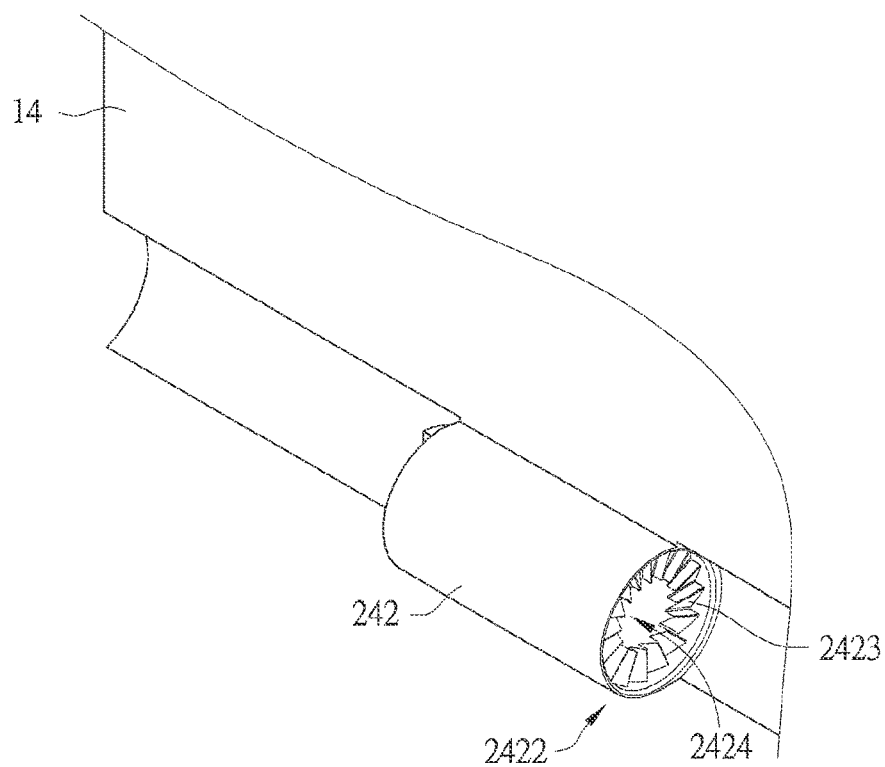
FIG. 8A is a three-dimensional schematic diagram of a side of a second base facing the second rotation element in FIG. 7.
Figure 8B:
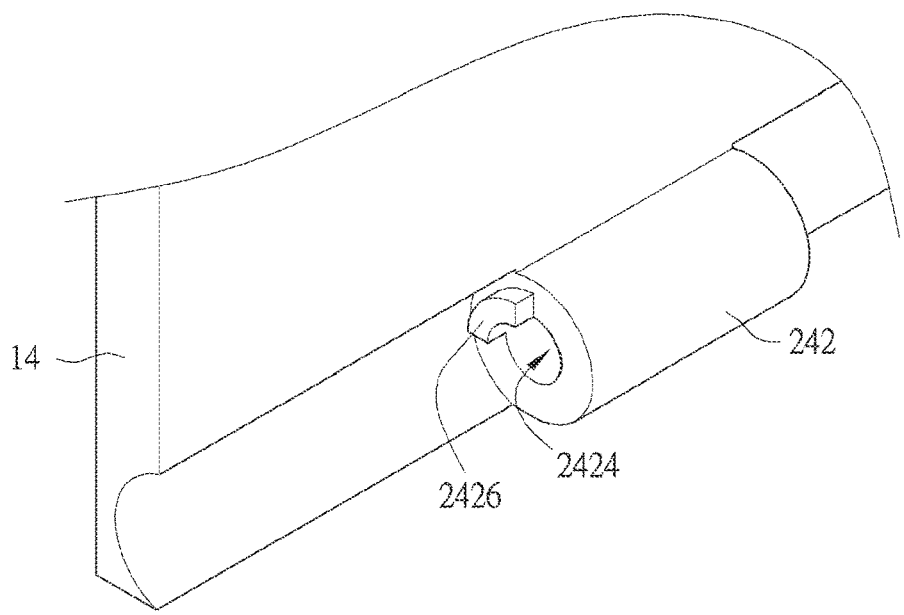
FIG. 8B is a three-dimensional schematic diagram of a side of a second base away from the second rotation element in FIG. 7.

Referring to FIG. 8 and FIG. 8A, FIG. 8A is a three-dimensional schematic diagram of a side of a second base facing the second rotation element in FIG. 7, and FIG. 8B is a three-dimensional schematic diagram of a side of a second base away from the second rotation element in FIG. 7.

As shown in the figures, the first shaft 242 includes a first surface 2422 and a circular opening 2424, the first surface 2422 is located on a side of the first shaft 242 facing the second shaft 244, and the circular opening 2424 is formed at a center of the first surface 2422.

The first surface 2422 includes a plurality of first oblique tooth structures 2423. The first oblique tooth structures 2423 are annularly arranged in a preset direction around the circular opening 2424. The structure of the first shaft 242 is similar to the first shaft 142 shown in FIG. 4A, and the details will not be repeated herein.

Different from the first shaft 142 shown in FIG. 4, the first shaft 242 in the present embodiment is provided with a bump 2426 on a side thereof away from the first surface 2422, so as to link with the torsion spring 260.

Figure 9A:
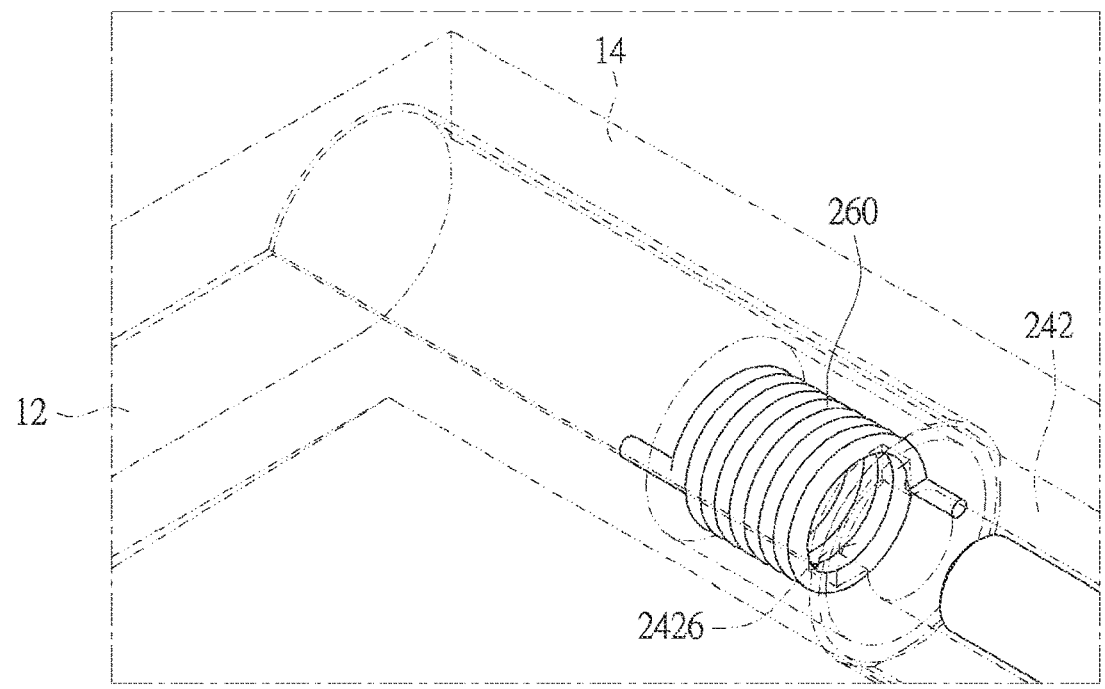
FIG. 9A and FIG. 9B show an overall operation process of the hinge structure in FIG. 7 when the second component opens upward relative to the first component.
Figure 9B:
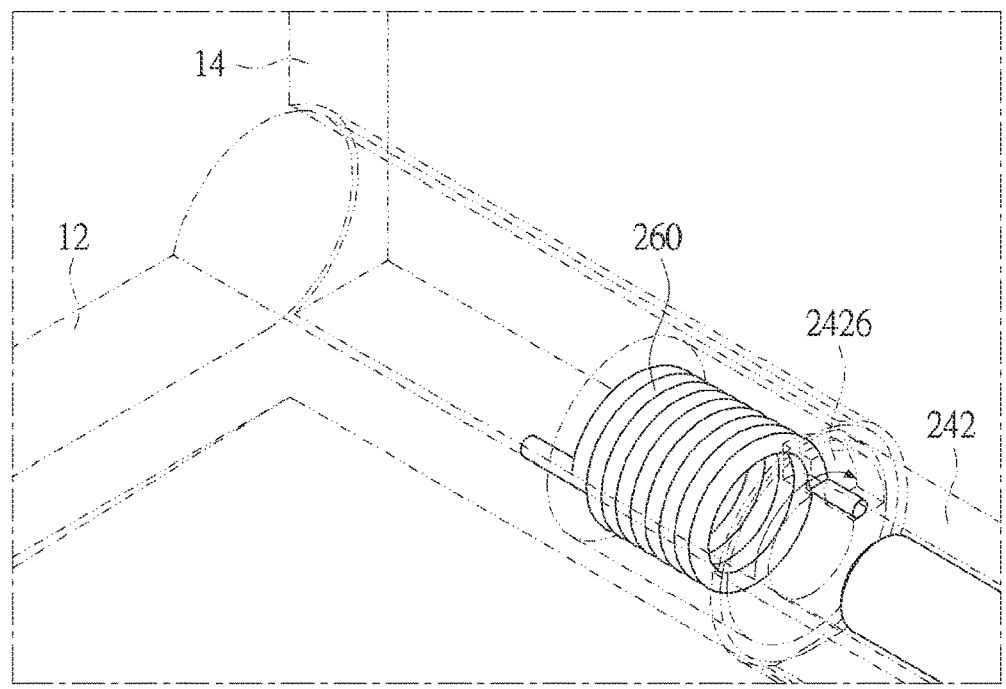

Referring to FIG. 9A and FIG. 9B, FIG. 9A and FIG. 9B show an overall operation process of the hinge structure 200 in FIG. 7 when the second component 14 opens upward relative to the first component 12. As shown in the figures, when the second component 14 opens upward relative to the first component 12 by an angle of less than 90 degrees, the bump 2426 on the first shaft 242 does not come into contact with the torsion spring 260.

When the second component 14 opens upward relative to the first component 12 by 90 degrees, the bump 2426 abuts against the torsion spring 260, and applies a force on the torsion spring 260. That is to say, when the second component 14 opens relative to the first component 12 by an angle of greater than 90 degrees, the torsion spring 260 receives a force (is pulled) and deforms to generate a torque to support the second component 14.

By the hinge structure 200 of the present embodiment, the opening operation requires a small force, the closing operation requires a larger force, and support required by the second component 14 is provided when the second component 14 is opened by an angle of greater than 90 degrees.

Figure 10A:
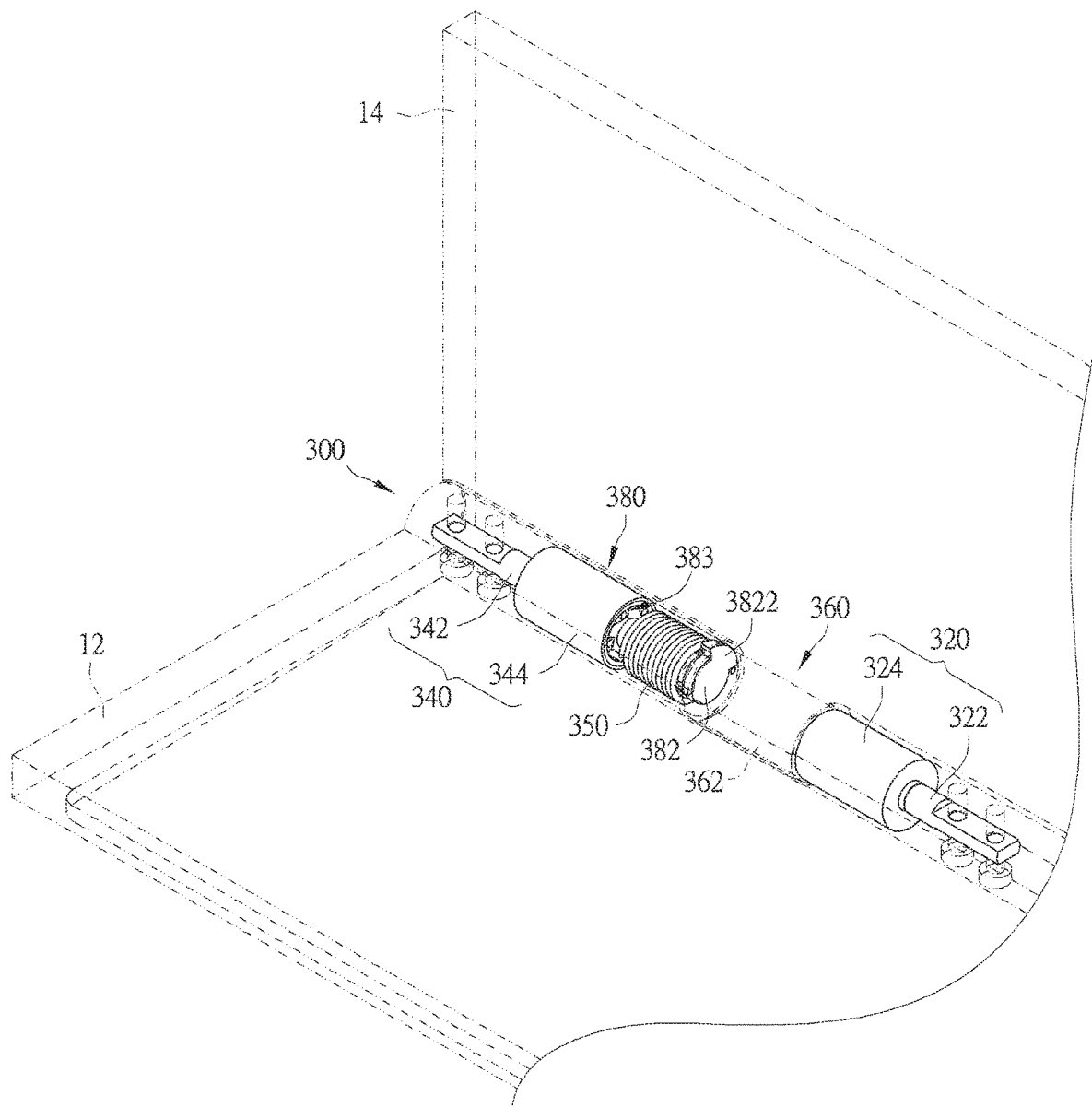
FIG. 10A is a three-dimensional schematic diagram of still another embodiment of a hinge structure of the present disclosure.

FIG. 10A is a three-dimensional schematic diagram of still another embodiment of a hinge structure of the present disclosure. As shown in the figure, the hinge structure 300 includes a first torque hinge 320, a second torque hinge 340, a first one-way pivoting mechanism 360, a second one-way pivoting mechanism 380 and a torsion spring 350.

The first torque hinge 320 includes a first base 322 and a first rotation element 324. The first base 322 connects to the first component 12, and the first rotation element 324 rotatably connects to the first base 322. The first torque hinge 320 is similar to the torque hinge 120 in FIG. 2, and the details will not be repeated herein.

The second torque hinge 340 includes a second base 342 and a second rotation element 344. The second base 342 connects to the first component 12, and the second rotation element 344 rotatably connects to the second base 342.

The first torque hinge 320 and the second torque hinge 340 are located on two opposite sides of the hinge structure

300. The second torque hinge 340 is also similar to the torque hinge 120 in FIG. 2, and the details will not be repeated herein.

Figure 10B:
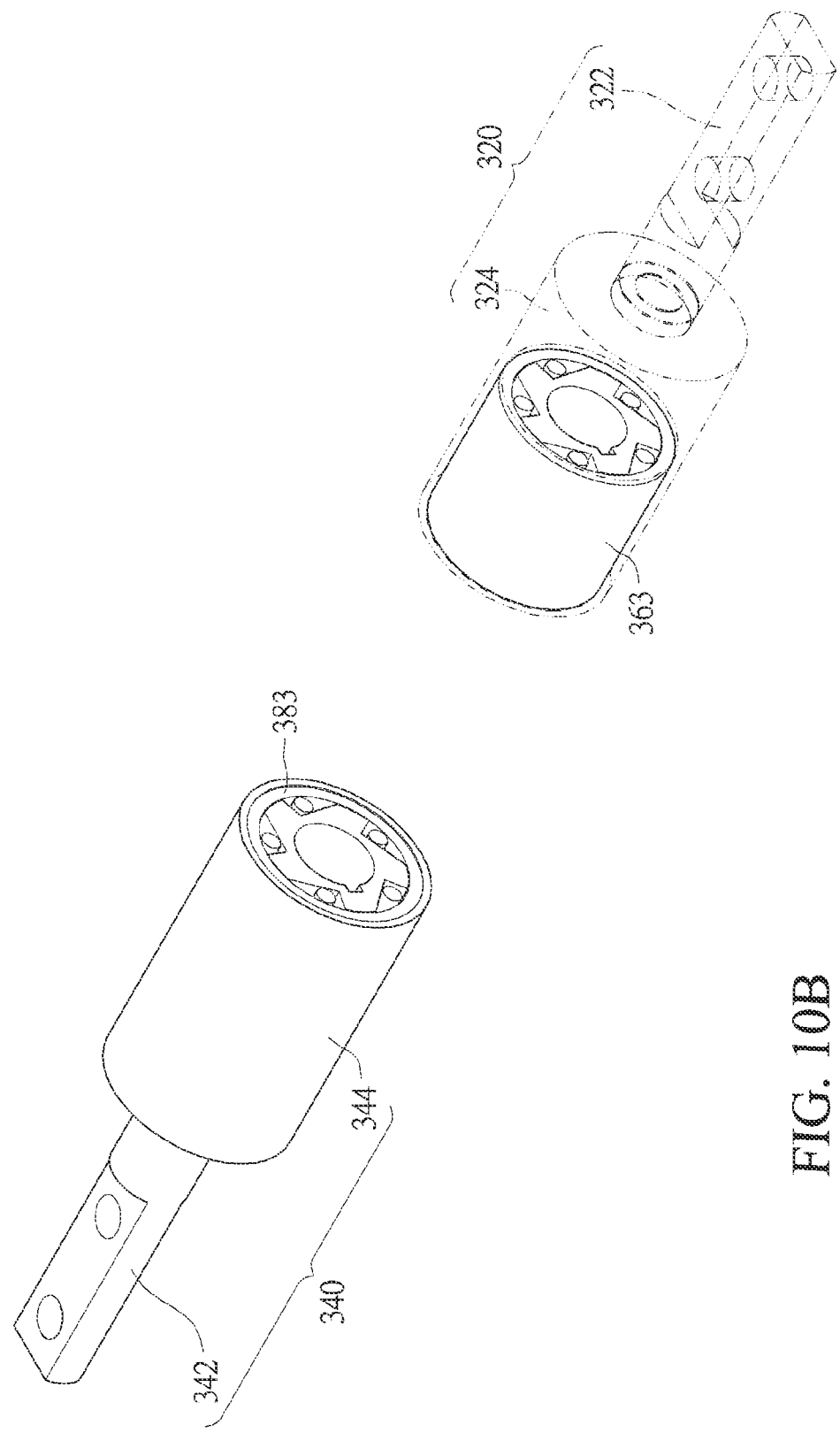
FIG. 10B shows a position where a one-way bearing in the hinge structure in FIG. 10A is disposed.

Referring to FIG. 10B, FIG. 10B shows a position where a one-way bearing in the hinge structure 300 in FIG. 10A is disposed.

As shown in the figure, the first one-way pivoting mechanism 360 includes a third base 362 and a first one-way bearing 363. The third base 362 connects to the second component 14.

The third base 362 pivotally connects to the first rotation element 324 of the first torque hinge 320 through the first one-way bearing 363. The first one-way bearing 363 limits the rotation of the first rotation element 324 relative to the third base 362.

The second one-way pivoting mechanism 380 includes a third rotation element 382 and a second one-way bearing 383. The third rotation element 382 pivotally connects to the second rotation element 344 of the second torque hinge 340 through the second one-way bearing 383.

The third rotation element 382 extends from the second rotation element 344 toward the third base 362, so as to link with the third base 362. The second one-way bearing 383 limits the rotation of the second rotation element 344 of the second torque hinge 340 relative to the third rotation element 382. The second one-way bearing 383 and the first one-way bearing 363 are rotatable in opposite directions.

The torsion spring 350 is disposed between the third base 362 and the second rotation element 344. In an embodiment, as shown in the figure, the torsion spring 350 is sleeved on the third rotation element 382. One end of the torsion spring 350 fixes to the first component 12, and the other end is driven by the third rotation element 382 of the second one-way pivoting mechanism 380.

Figure 11A:
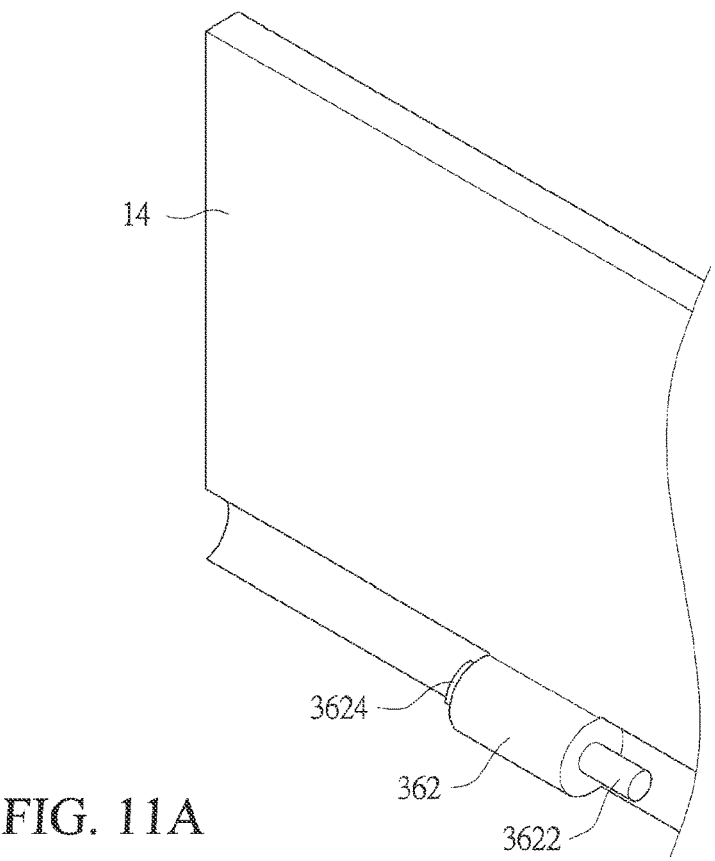
FIG. 11A and FIG. 11B are three-dimensional schematic diagrams of an embodiment of a third base in FIG. 10A.
Figure 11B:
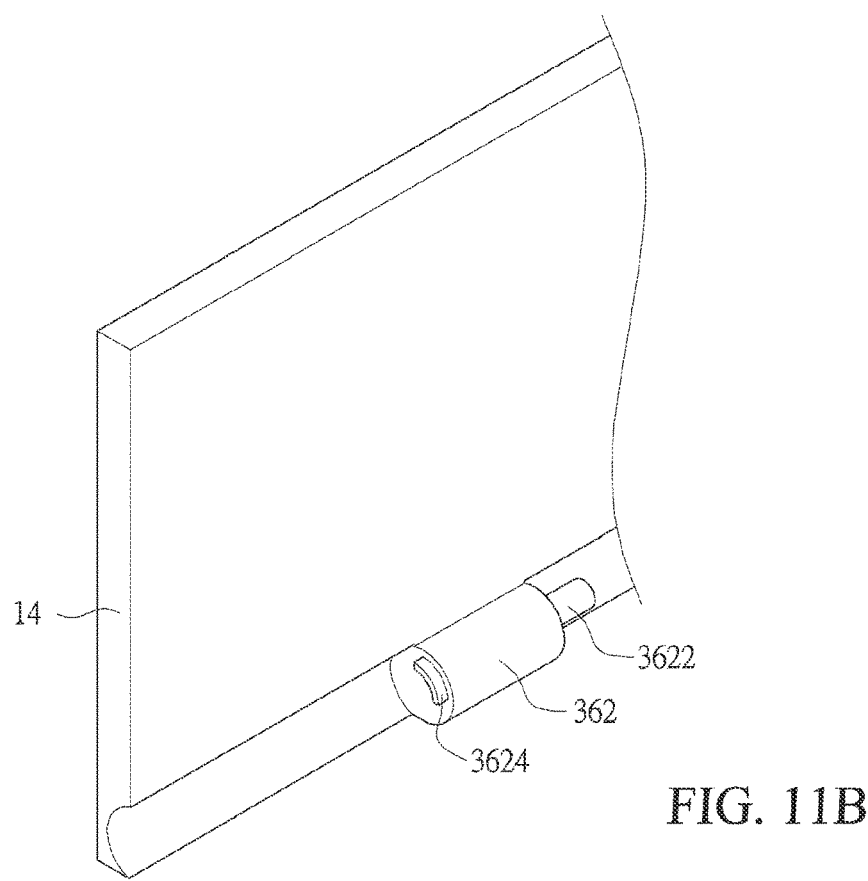

FIG. 11A and FIG. 11B are three-dimensional schematic diagrams of an embodiment of a third base in FIG. 10A. FIG. 11A is a three-dimensional schematic diagram of a side of a third base facing the first rotation element in FIG. 10A. FIG. 11B is a three-dimensional schematic diagram of a side of the third base facing the second rotation element in FIG. 10A.

As shown in the figures, the third base 362 is provided with a cylindrical protrusion 3622 on a surface thereof facing the first rotation element 324. The first rotation element 324 is provided with a sleeve (not shown) on a surface thereof facing the third base 362. The first one-way bearing 363 is mounted between the cylindrical protrusion 3622 and the sleeve, so that the third base 362 rotatably connects to the first rotation element 324 of the first torque hinge 320.

The third base 362 is provided with a bump 3624 on a surface thereof facing the second rotation element 344. The bump 3624 abuts against the third rotation element 382 when the second component 14 moves relative to the first component 12 by 90 degrees.

Referring back to FIG. 10A, the third rotation element 382 pivotally connects to the second rotation element 344 through the second one-way bearing 383, and extends from the second rotation element 344 toward the third base 362.

The torsion spring 350 is sleeved on the third rotation element 382. The third rotation element 382 is provided with an end portion 3822 on a surface thereof away from the second rotation element 344. The end portion 3822 is configured to abut against and apply a force to the torsion spring 350.

Figure 12A:
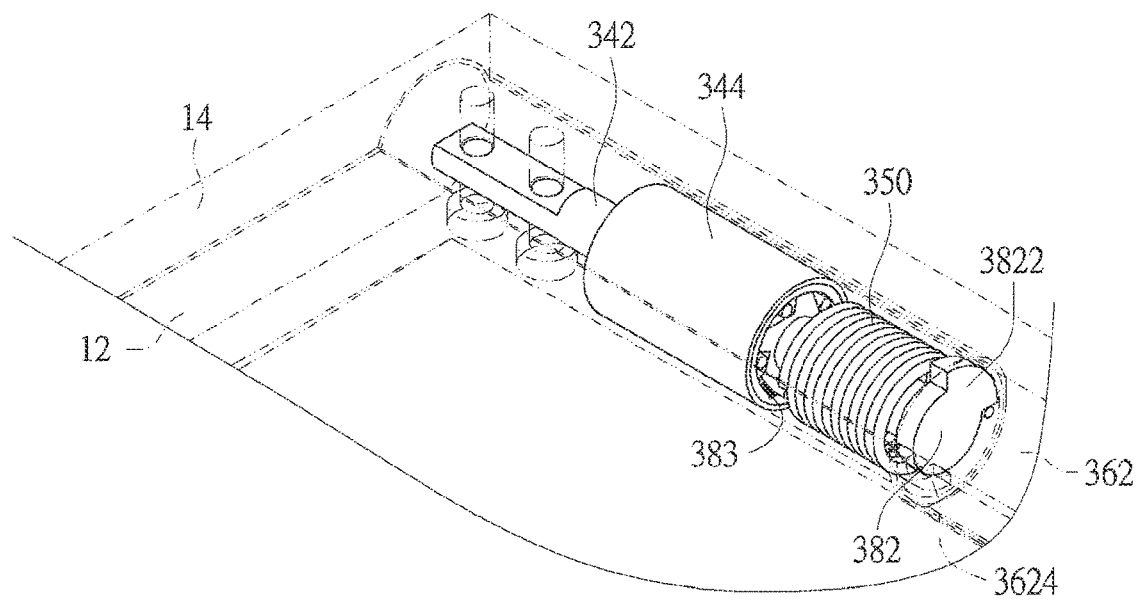
FIG. 12A and FIG. 12B show an overall operation process of the hinge structure in FIG. 10A when the second component opens upward relative to the first component.
Figure 12B:
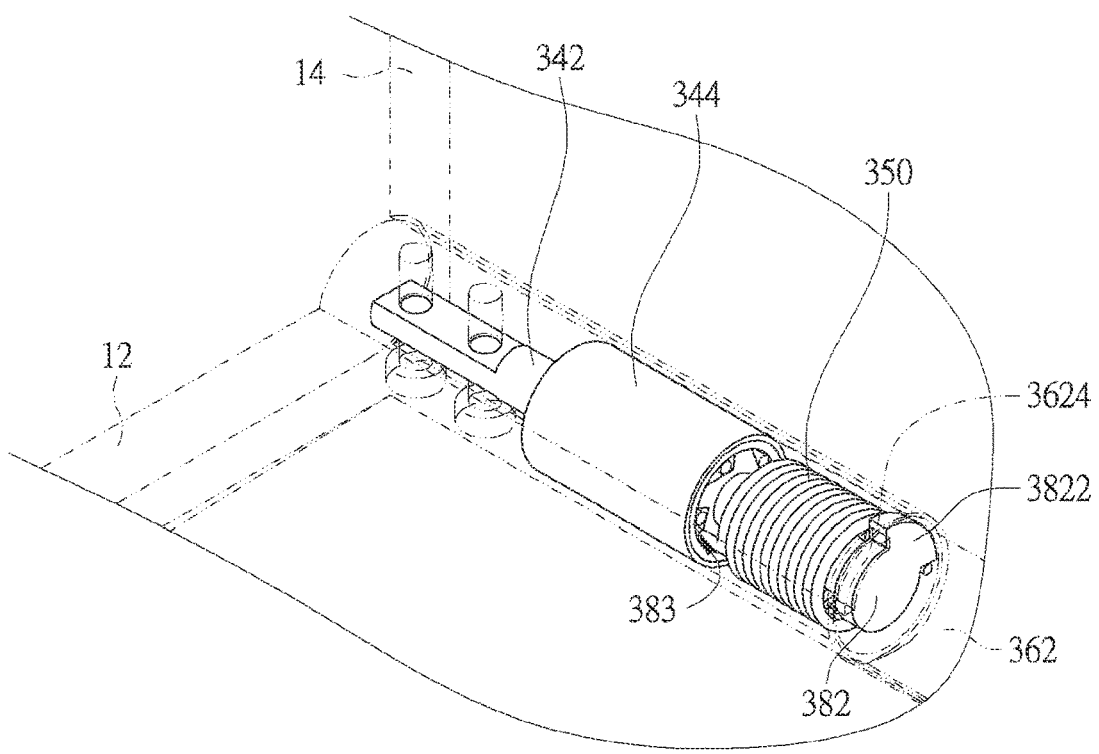

Referring to FIG. 12A and FIG. 12B, FIG. 12A and FIG. 12B show an overall operation process of the hinge structure in FIG. 10A when the second component moves relative to the first component.

When the second component 14 opens upward relative to the first component 12 by an angle of less than 90 degrees, the second component 14 opens only by a small external force because the direction in which the second component 14 opens relative to the first component 12 is the same as the direction in which the first one-way bearing 363 is rotatable.

When the angle by which the second component 14 opens upward relative to the first component 12 reaches 90 degrees, the bump 3624 of the third base 362 abuts against the end portion 3822 of the third rotation element 382, starts to drive the third rotation element 382 to rotate, and at the same time applies a force to the torsion spring 350 through the end portion 3822 of the third rotation element 382.

When the angle by which the second component 14 is opened relative to the first component 12 exceeds 90 degrees, the rotating direction of the second one-way bearing 383 is opposite to the rotating direction of the first one-way bearing 363, so the third rotation element 382 drives the second rotation element 344 to rotate. A torque generated by the rotation of the second torque hinge 340 is configured to support the second component 14.

When the second component 14 moves from the above opening position toward the first component 12, the moving direction of the second component 14 relative to the first component 12 is opposite to the rotating direction of the first one-way bearing 363, so the third base 362 drives the first rotation element 324 to rotate. Meanwhile, the torsion spring 350 pushes the third rotation element 382 into position, that is, to a position where the end portion 3822 of the third rotation element 382 exactly abuts against the torsion spring 350.

In this way, when the second component 14 is opened relative to the first component 12 by an angle of less than 90 degrees, the hinge structure 300 of the present embodiment requires a small force for opening and a larger force for closing; when the second component 14 is opened relative to the first component 12 by an angle of greater than 90 degrees, the second component is further effectively supported, so as to adapt to different requirements of the user during use.

In the embodiment of FIG. 1A and FIG. 1B, the hinge structure 100 pivotally connects to a host part (i.e., the first component 12) and a screen part (i.e., the second component 14) of a notebook computer, but the present disclosure is not limited thereto.

Figure 13:
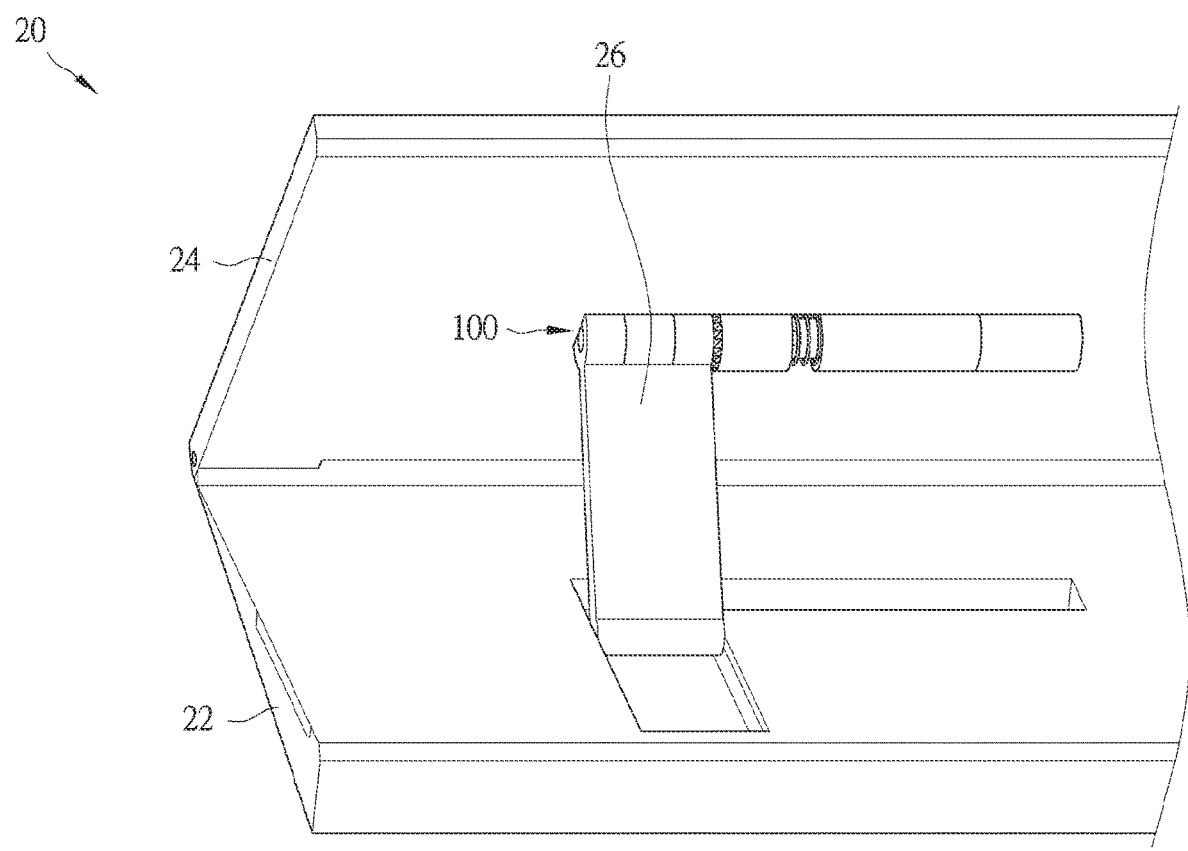
FIG. 13 is a three-dimensional schematic diagram of another embodiment of an electronic device of the present disclosure.

FIG. 13 is a three-dimensional schematic diagram of another embodiment of an electronic device of the present disclosure. In this embodiment, the electronic device 20 includes a base 22, a screen 24 and a support bracket 26. The screen 24 pivotally connects to the base 22.

One end of the support bracket 26 pivotally connects to a middle position on a rear surface of the screen 24, and the other end is slidably and rotatably connected to the base 22. By changing the angle between the screen 24 and the support bracket 26, an inclination angle of the screen 24 is adjusted.

The hinge structure 100 of the embodiment is disposed between the screen 24 and the support bracket 26, but it is not limited thereto. In some embodiments, the hinge structure 100 in the figure is replaced with the hinge structure 200 of FIG. 7 or the hinge structure 300 of FIG. 10A.

Figure 14:
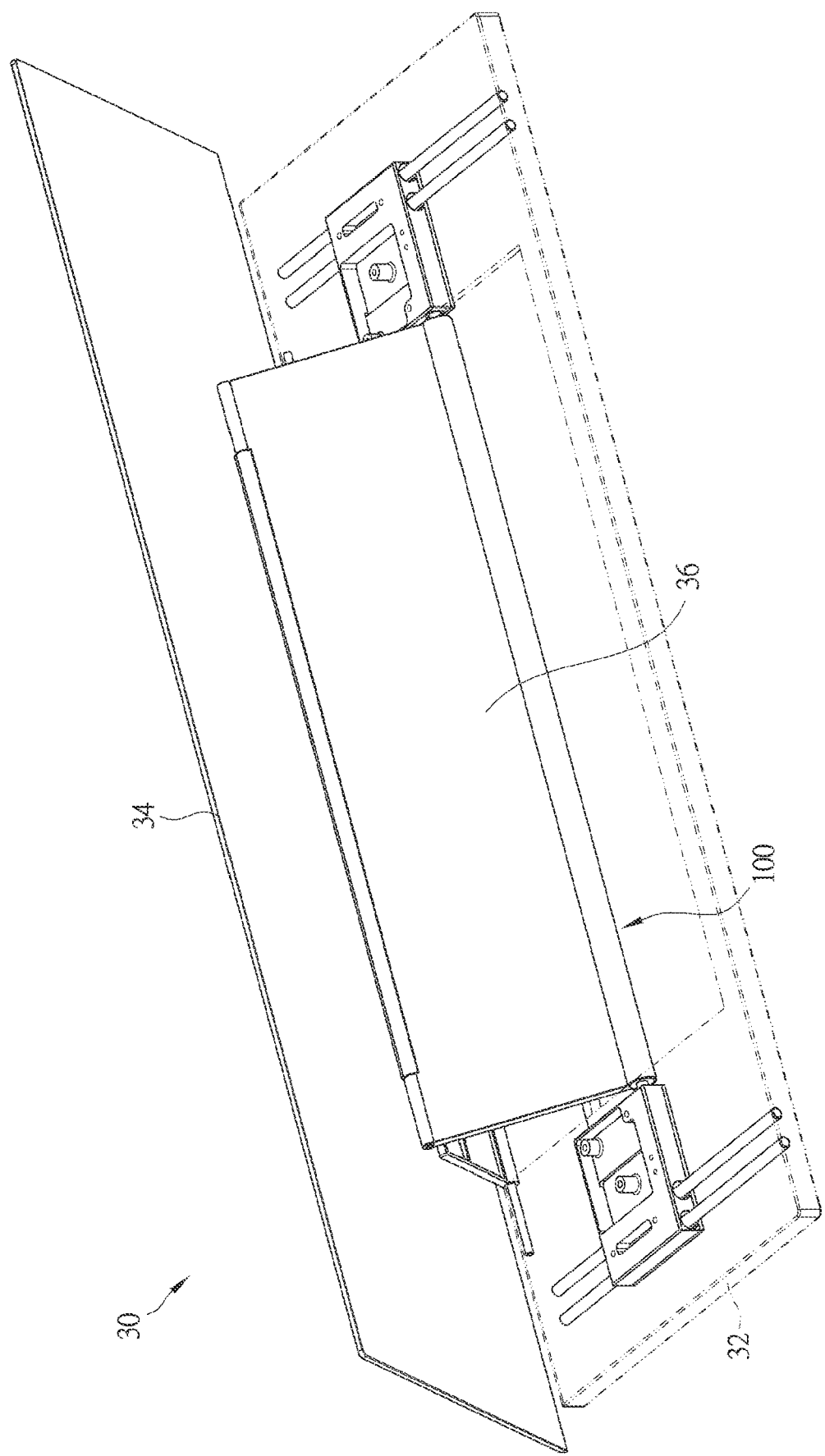
FIG. 14 is a three-dimensional schematic diagram of still another embodiment of an electronic device of the present disclosure.

FIG. 14 is a three-dimensional schematic diagram of still another embodiment of an electronic device of the present disclosure. In this embodiment, the electronic device 30 includes a base 32, a screen 34 and a support bracket 36. The screen 34 pivotally connects to the base 32.

One end of the support bracket 36 pivotally connects to a middle position on a rear surface of the screen 34, and the other end slidably and rotatably connects to the base 32. By changing the angle between the support bracket 36 and the base 32, an inclination angle of the screen 34 is adjusted.

The hinge structure 100 of the embodiment is disposed between the base 32 and the support bracket 26, but it is not limited thereto. In some embodiments, the hinge structure 100 in the figure is replaced with the hinge structure 200 of FIG. 7 or the hinge structure 300 of FIG. 10A.

By the hinge structures 100, 200 and 300 provided in the disclosure, when the second component 14 (for example, a screen of a notebook computer) opens, the torque hinge does not be driven to rotate, and therefore, the user does not feel the rotational resistance generated from the torque hinge. In contrast, when the second component 14 closes, the torque hinge is driven to rotate. In this way, the second component 14 is maintained at a desired angular position by a sufficient support force provided by the torque hinge, and the second component 14 is easily opened for a user by using a single hand.

The above descriptions are only exemplary embodiments of the present disclosure, and are not intended to limit the present disclosure. Any form of equivalent replacements or modifications made by those skilled in the art to the technical means and technical contents disclosed in the present disclosure without departing from the scope of the technical means of the present disclosure is to be considered as contents that do not depart from the technical means of the present disclosure, and falling within the scope of protection of the present disclosure.

What is claimed is:

1. A hinge structure, applied to an electronic device, wherein the electronic device comprises a first component and a second component, the hinge structure comprising:
   a torque hinge, comprising a first base and a first rotation element, wherein the first base connects to the first component, and the first rotation element rotatably connects to the first base; and
   a one-way pivoting mechanism, wherein the second component pivotally connects to the first rotation element through the one-way pivoting mechanism;
   wherein the one-way pivoting mechanism comprises a first shaft and a second shaft, the first shaft connects to the second component, the second shaft links with the first rotation element, the first shaft comprises a first surface, the second shaft comprises a second surface facing the first surface, the first surface comprises a plurality of first oblique tooth structures annularly arranged on the first surface, and the second surface comprises a plurality of second oblique tooth structures annularly arranged on the second surface;
   wherein the first oblique tooth structure includes an inclined surface and a straight surface, and the straight surface is parallel to the axial direction of the one-way pivoting mechanism.

2. The hinge structure according to claim 1, wherein the second shaft movably connects to the first rotation element along an axial direction of the one-way pivoting mechanism.

3. The hinge structure according to claim 1, wherein the second shaft comprises a sleeve portion, the first rotation element comprises an end portion, and the end portion extends into the sleeve portion.

4. The hinge structure according to claim 3, wherein the sleeve portion comprises a slide groove, the end portion comprises a protruding element, and the protruding element is slidably disposed in the slide groove.

5. The hinge structure according to claim 1, further comprising an elastic element, disposed between the first rotation element and the second shaft.

6. The hinge structure according to claim 1, wherein the first component is a host part, and the second component is a screen part.

* * * * *